United States Patent [19]
Johnson

[11] Patent Number: 4,502,736
[45] Date of Patent: Mar. 5, 1985

[54] VEHICLE WITH PNEUMATIC SUSPENSION

[75] Inventor: Neil M. Johnson, Chardon, Ohio

[73] Assignee: Traction Research, Inc., Chardon, Ohio

[21] Appl. No.: 287,050

[22] Filed: Jul. 27, 1981

[51] Int. Cl.[3] .................. B62D 55/12; B62D 55/16; B62D 55/24

[52] U.S. Cl. .............................. 305/9; 305/25; 305/34; 305/35 EB

[58] Field of Search ............ 180/9.1, 9.44; 280/683, 280/693, 698, 711, 713; 305/9, 10, 16, 17, 27, 28, 34, 25, 35 EB

[56] References Cited

U.S. PATENT DOCUMENTS

| | | | |
|---|---|---|---|
| 2,756,048 | 7/1956 | Pfeiffer | 280/711 X |
| 2,879,076 | 3/1959 | Stricker, Jr. | 280/683 X |
| 2,900,210 | 8/1959 | Parsons | 305/17 X |
| 3,020,059 | 2/1962 | Allen | 180/9.1 X |
| 3,037,790 | 6/1962 | Gouirand | 280/693 |
| 3,861,706 | 1/1975 | Gouirand | 280/711 |

FOREIGN PATENT DOCUMENTS 1394961  3/1965  France .

Primary Examiner—David A. Scherbel
Attorney, Agent, or Firm—Maky, Renner, Otto & Boisselle

[57] ABSTRACT

A relatively low-cost, lightweight vehicle has a traction belt drive system, a force-spreading air bag suspension, and operational efficiency features. The traction belt cooperates with track wheel assemblies on each side of the vehicle to spread the suspension forces and to provide efficient steering ability. Each traction belt can be in the form of a Moebius strip. The air bag suspension uses integral air bags on each side of the vehicle cooperative with plural flaps pivotable on a central keel to spread varying suspension forces and to smooth the ride over a variety of terrains. The vehicle lends itself to efficient relatively low cost manufacturing techniques using standard materials.

70 Claims, 11 Drawing Figures

VEHICLE WITH PNEUMATIC SUSPENSION

TECHNICAL FIELD

The present invention relates to vehicles and more particularly to a number of improvements in a traction drive belt, track wheel assembly, steering apparatus, suspension system, general construction, and power train of a vehicle.

BACKGROUND

Since the oil embargo of 1973, periodic fuel shortages in spite of steadily increasing prices for petroleum-derived products have dramatically changed the economics of automobile operation and ownership throughout the world. The automobile industry in the United States reacted to government regulation and the changing market with prolonged programs for downsizing and weight reduction of existing marques, introduction of new models similar to the smaller European and Japanese designs, and evaluation of existing and new materials as possible substitutes for the traditional heavy materials, notably steel, rubber and glass.

Although evolutionary in nature, the recent changes in design and manufacture of American automobiles are unprecedented in number and frequency. The cost in product quality and corporate cash flow problems to effect such changes has been substantial and no doubt will be studied by engineers and economists for many years.

Two problems basic to the design of conventional automobiles have interfered with the evolution of a successful economy car. First, physical compromises are such that an automobile designer ordinarily must sacrifice either performance or comfort to achieve operating economy. Second, a lightweight vehicle, which may be more energy-efficient than a heavy one, may actually cost more dollars than a heavier vehicle because of the necessity for using exotic materials, unorthodox manufacturing methods, and specially-designed components. As a result of the balanced approach currently being taken by the automotive industry among cost, performance and comfort, the automobile market has shown a remarkable ambivalence toward the modern "economy car" in spite of high fuel prices and the nearly universal expectation of still higher fuel prices in the future.

As used herein, the terms vehicle, automobile, and the like may be used interchangeably and in general are intended to include any self-propelled or passive load-transporting device the same as or similar to the following machines: automobiles, vans, pickup trucks, station wagons, mobile homes, ambulances, etc.; trucks; trailer or wagons; recreational vehicles, such as golf carts, snowmobiles, etc.; medical equipment, such as wheelchairs, hospital carts, etc.; aircraft taxiing or ground propulsion and/or braking systems; mobile machinery of any kind, including agricultural, mining, lawn, garden, forestry, etc.

Weight is a major problem in conventional vehicles. Often the weight and strength of frame and chassis members must accommodate the large force concentrations when the standard four point suspension, i.e. with wheels at each of the four corners of the vehicle, is used. Vehicles with drive belts or drive treads, such as a bulldozer, still have principal vehicle support points at opposite extremities or corners. Another disadvantage with such belt driven or tracked vehicles is the generally reduced maneuverability relative to conventional vehicles. Moreover, in conventional vehicles rugged functional mechanisms of large mass, e.g. tires, wheels, brakes, steering linkages and joints, bearings, wheel spindles, axles, differential gearing, springs, shock absorbers, and drive shaft, are mounted at locations where they tend to behave collectively like linear harmonic oscillators, especially as the vehicle passes over uneven road surfaces. Such oscillations cause considerable displacement of the vehicle body itself from a smooth trajectory causing passenger discomfort and excessive wear, and the displacements become progressively more abrupt as the vehicle weight decreases or as the suspension spring constants, unsprung weight, and unused payload capacity increase.

SUMMARY

According to one aspect of the present invention there is provided a vehicle and features for use in vehicles that overcome a number of the aforesaid and other disadvantages in prior art vehicles. For example, according to one aspect of the invention there is provided a vehicle chassis and suspension system which appreciably spreads or distributes the suspension forces and, therefore, permits use of relatively low-strength and lightweight materials. One embodiment of this vehicle construction feature employs a relatively low pressure air bag suspension spring.

According to another aspect an endless belt whose cross section is reentrant to provide positive constraint on movement and effective operation to effect longitudinal vehicle movement and belt movement relative to the vehicle is used in such a vehicle. An example of such endless belt is one having an I-cross section with cogged surfaces on both sides of the web and with opposite ends of the belt being rotated relative to each other prior to joining to form the endless belt as a Moebius strip that has wear surfaces, then, at both flanges thereof and also provides a measure of self-cleaning of the cogged surfaces.

According to an additional aspect there is provided a lightweight track wheel assembly having a pair of laterally inclined track wheels contoured to mate with the reentrant surfaces of the traction belt for constraining the same positively against appreciable lateral or vertical relative motion and to transmit a portion of the vehicle weight to the most horizontal of the lower reentrant surfaces of the belt as the vehicle moves longitudinally along them. Preferably each track wheel assembly is independently mounted on a suspension mechanism; preferably there are at least four or more such track wheel assemblies on each side of the vehicle; and preferably each track wheel assembly is independently pivotable to facilitate steering the vehicle.

According to a further aspect a system of steering linkages control the steering angle of any track wheel assembly during a turning maneuver in approximate proportion to the distance of that track wheel assembly from the center, centroid, or other reference point of the vehicle. Such steering linkage system may effect simultaneous steering of a collection of track wheel assemblies by equal and opposite longitudinal movements of respective steering linkages, and such steering mechanism may be used for emergency braking.

According to still another aspect a suspension system has plural flap-like members that may undergo motion relative to the vehicle constrained by a horizontal hinge or zone of elastic deflection. Such suspension provides for distribution of suspension forces by using multiple flaps, including preferably four or more such flaps along each side of the vehicle, and the cooperation of respective flaps with a relatively low pressure air bag spring-like mechanism. The suspension preferably, too, separates at least some of the heavy mechanical components used to transmit braking and tractive torques by using a flexible traction belt for transmitting tractive and braking forces to the road surface.

According to still an additional aspect there is provided an improved power train for a vehicle and particularly a traction type vehicle using preferably the combination of a thermal engine and an electric motor together with appropriate differential gearing, sprockets, and the like.

With the foregoing in mind, a primary object of the present invention is to provide a vehicle that is improved in the noted respects.

Another object is to improve fuel economy in a vehicle.

An additional object is to reduce the weight of a vehicle.

A further object is to improve maneuverability of a traction type vehicle.

Still another object is to increase the life expectancy of a vehicle.

Still an additional object is to provide improved drive/traction means for a vehicle.

Still a further object is to improve the ride in a vehicle.

Even another object is to improve the power transmission and overall efficiency in an automotive vehicle.

Even an additional object is to provide an improved drive/traction belt for a vehicle.

Even a further object is to reduce the weight and to improve the efficiency and effectiveness of a vehicle suspension.

Yet another object is to improve steerability of a belt driven or traction vehicle.

Yet an additional object is to provide an air bag suspension for a vehicle, especially using a flap suspension arrangement.

Yet a further object is to separate the larger mechanical components of a vehicle from suspension motions.

Yet still another object is to reduce the weight and strength requirements for a vehicle chassis and/or frame.

Yet still an additional object is to spread the force concentration in a vehicle suspension.

Yet still a further object is to improve the power train of a vehicle including, especially, the energy efficiency thereof.

Other objectives of the invention include the reducing of the manufacturing costs for a vehicle, using, for example, common materials, simplified assembly methods, minimized machining operations and simplified propulsion methods.

Another important objective is to improve the economy of operation of a vehicle through minimization of vehicle weight and adaptation of a power transmission to take advantage of the characteristics of an efficient power source.

Yet another important objective is to improve passenger comfort in a vehicle through isolation of heavy mechanical components from suspension motion.

Even another important objective is to increase the useful life of a vehicle by use of corrosion-proof materials and through ready accessibility of components for repair or replacement even by the owner himself.

Another principal objective of the invention is to provide a vehicle that has a general capability to adapt to a variety of road surfaces and driving conditions, especially while maintaining a high level of efficiency of operation.

These and other objects and advantages of the present invention will become apparent as the following description proceeds.

To the accomplishment of the foregoing and related ends, the invention, then, comprises the features hereinafter fully described in the specification and particularly pointed out in the claims, the following description and the annexed drawings setting forth in detail certain illustrative embodiments of the invention, these being indicative, however, of but several of the various ways in which the principles of the invention may be employed.

DESCRIPTION OF THE PREFERRED EMBODIMENT

Figure 1:
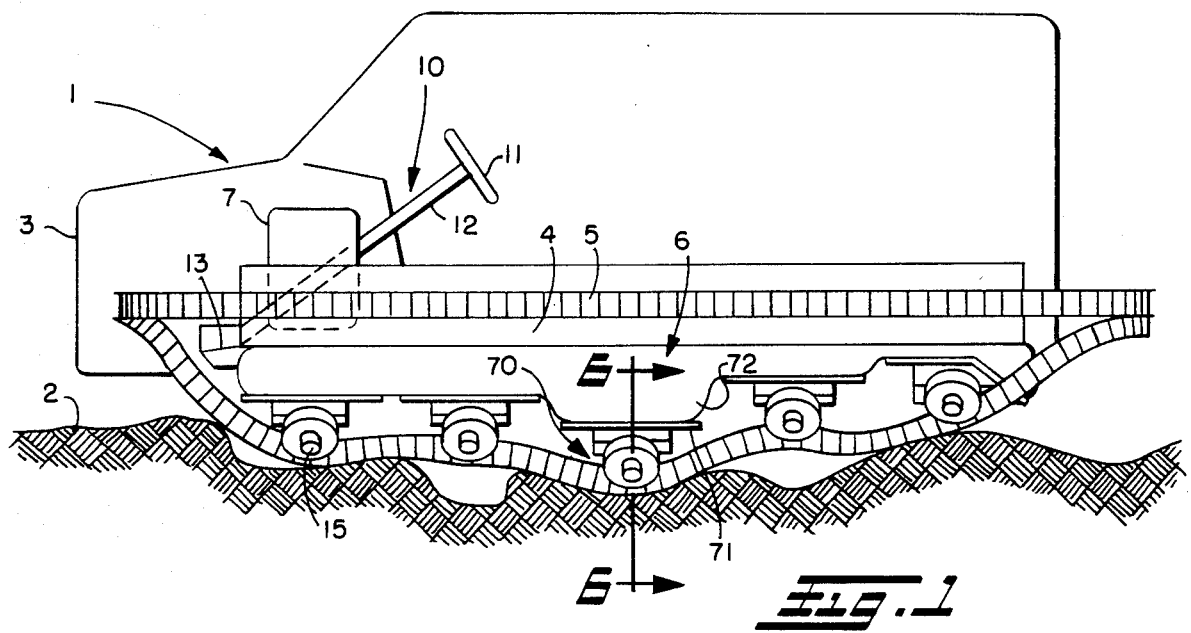
FIG. 1 is a fragmentary side elevation view, partly schematically presented, of a vehicle in accordance with the present invention.

Referring now in detail to the drawings, wherein like reference numerals designate like parts in the several figures, and initially to FIG. 1, a vehicle in accordance with the present invention is indicated generally at 1 riding over a rough terrain 2. However, it will be appreciated that although the vehicle is well suited to use on rough terrain, it also may be used on relatively smooth terrain, such as paved or unpaved roads and highways. Vehicle 1 includes a body 3 fastened by conventional means (not shown) to a chassis 4. A traction drive belt 5 provides the driving force to move the vehicle in forward or reverse direction, and a suspension 6 provides the interconnecting apparatus between the body and chassis 4, on the one hand, and the traction drive belt 5 on the other. An engine 7, such as a thermal engine, e.g. an internal combustion engine, or turbine, etc., is the main source of power for the vehicle 1. To guide or to steer the vehicle 1, a steering assembly 10 includes a steering wheel 11 operable by the driver within the vehicle, i.e. as enclosed by the body 3, for example, a steering column connection 12, a steering gear box 13, and a steering linkage assembly 14 (not shown in FIG. 1, but seen in FIGS. 5, 10 and 11). Track wheels 15 forming part of the suspension 6 cooperate with the traction drive belt 5 to guide the same in generally linear motion to move the vehicle 1; additionally, at least some of the track wheels 15 may be swivelable about, for example, a vertical axis in response to torque applied by the steering linkage assembly 14 to effect directional control, i.e. turning, of the vehicle 1.

DRIVE TRAIN

Figure 2:
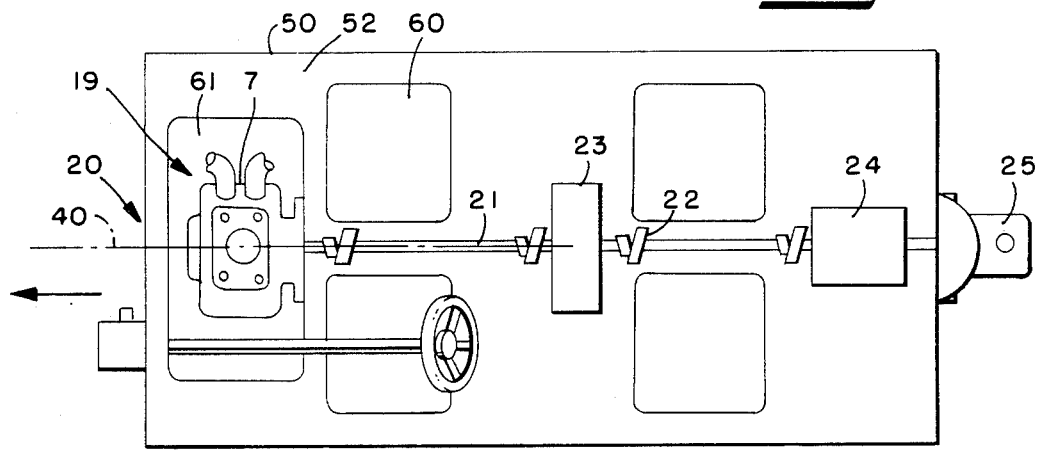
FIG. 2 is a top plan view of the chassis box of the vehicle of FIG. 1.
Figure 3:
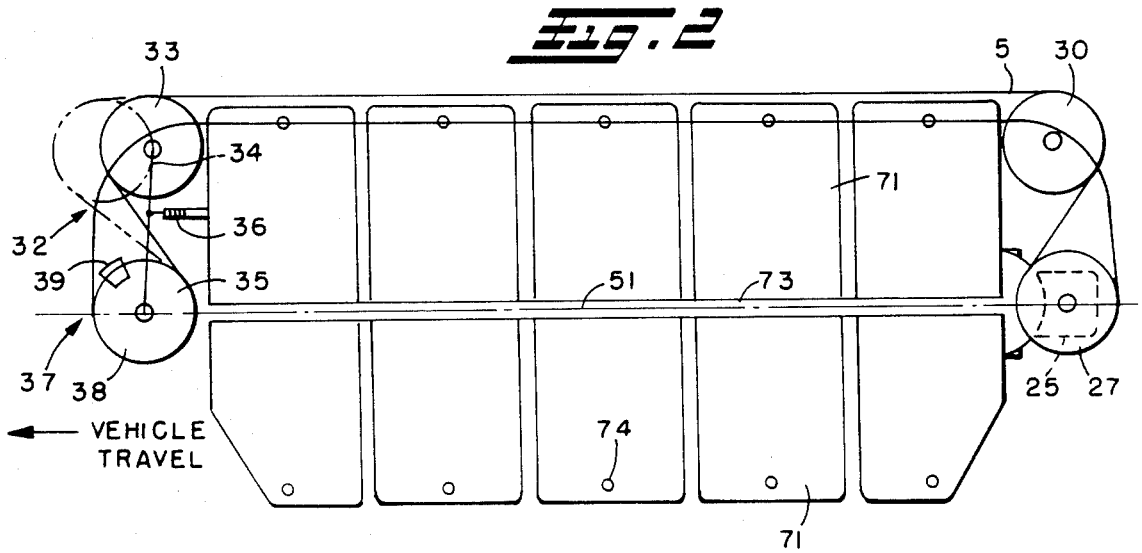
FIG. 3 is a top plan view of the suspension flaps, keel and belt tensioning apparatus of the vehicle.
Figure 4:
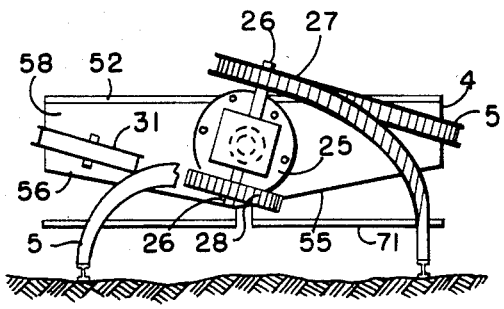
FIG. 4 is a rear elevation view of the belt drive assembly.

Turning now to FIGS. 2, 3 and 4, the drive power apparatus or drive train of the vehicle is generally indicated at 19. The drive power apparatus 19 includes the power train 20, traction drive belt 5, and associated apparatus now described. In the power train 20 the engine 7 generates a work output causing rotation of a conventional drive shaft 21 having several universal joint linkages 22 therein for the usual purposes. The drive shaft 21 is split into a primary drive shaft portion 21P and a secondary drive shaft portion 21S, the two being linked by a conventional eddy current clutch 23, which serves to limit the torque applied to subsequent mechanisms. An electric motor 24 also may be coupled to the drive shaft to provide motive power for the vehicle independently of the engine 7. The power train 20 additionally includes a differential-geared transmission 25, which in response to rotation of the secondary drive shaft portion 21S provides a torque output on its output shaft 26 to rotate respective drive sprockets 27, 28 that move the traction drive belts 5. More specifically, each traction drive belt 5 has a cogged portion, which is described further below, to cooperate with the drive sprockets 27, 28, as is seen most clearly in FIG. 4. Idler wheels 30, 31 guide the respective traction drive belts 5 from each side of the vehicle to the respective drive sprockets 27, 28 at the rear of the vehicle 1.

There are, of course, two traction drive belts 5, one on each side of the vehicle 1 driven by the power train 20. There also is a tensioning and brake apparatus 32 at the forward end of the vehicle. The tensioning and brake apparatus adjusts the appropriate tension in the respective traction drive belts 5 and provides a source of braking work to slow or to stop the vehicle 1 when in motion or to hold the same in a stopped position. Only one half of the tensioning and brake apparatus 32 is shown in FIG. 3 associated with a single traction drive belt 5 for convenience of illustration; however it will be appreciated that there would be a similar opposite half of the apparatus 32 for use with the other traction drive belt 5. Specifically, the tensioning and brake apparatus 32 includes a tensioning idler wheel 33 about which the belt 5 moves, as shown in FIG. 3. The wheel 33 is movable to increase or decrease the amount of tension in the belt 5. Such movement is effected by a pivot type of movement of a pivotable mounting arm 34 on which the idler wheel 33 is mounted. The arm 34 is attached at one end to pivot point 35 on the vehicle, and an actuator 36, such as a pneumatic cylinder mounted by a clevis (not shown) to the chassis and to a location on the arm 34 spaced apart from the pivot point 35. By increasing or decreasing the force exerted by the actuator 36 on the arm 34, the magnitude of tension in the traction drive belt 5 can be controlled. Such control may be effected manually or automatically; in the latter case conventional means may be provided to detect the tension and possibly other parameters, such as vehicle speed, terrain condition, etc., and to use that information to effect automatic adjustment of the actuator 36 and, thus, the belt tension, especially as the suspension encounters displacement relatively to the chassis. Furthermore, a disk brake and sprocket assembly 37 includes a terminal sprocket 38 about which the belt 5 is directed and a disk brake caliper 39 controllable to cooperate with a brake disk portion on the terminal sprocket 38, for example, or otherwise associated therewith, to control rotational speed of the terminal sprocket 38 and, therefore, the linear speed of the belt 5, thereby to effect controlled vehicle braking.

Figure 6:
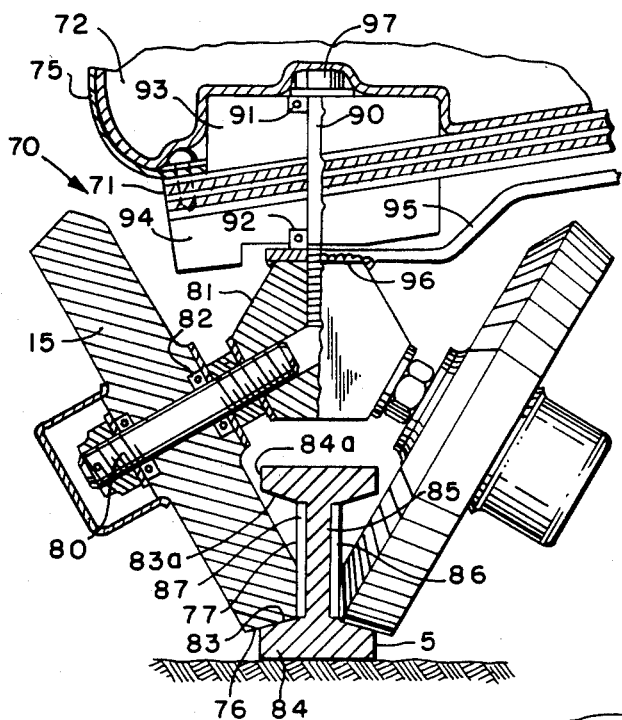
FIG. 6 is an enlarged view, partly in section, of a typical track wheel assembly, the mounting thereof to a suspension flap, and a connection to the steering linkage.
Figure 9:
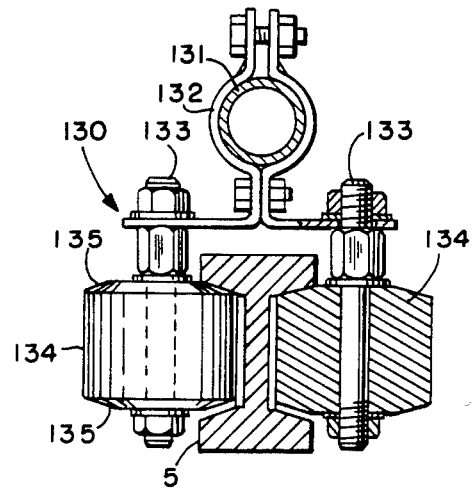
FIG. 9 is an elevation view, partly in section, of a belt guide wheel assembly.
Figure 7:
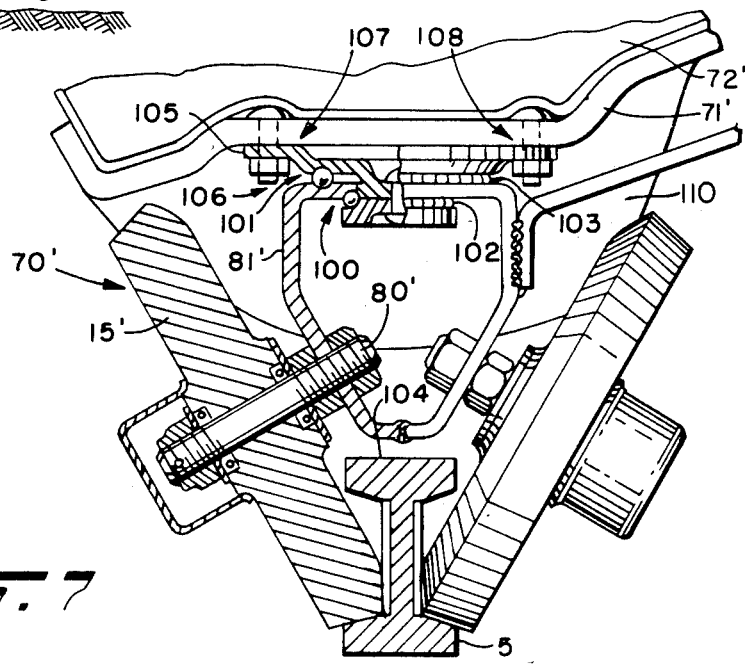
FIG. 7 is an enlarged view, partly in section, of a modified track wheel assembly, the mounting thereof to a suspension flap, and a connection to the steering linkage.

The traction drive belts 5 on each side of the vehicle are guided along respective paths by the drive sprockets 27, 28, idler wheels 30, 31, tensioning idler wheels 33, terminal sprockets 38, track wheel assemblies, which are shown in detail in FIGS. 6 and 7 and of which the wheels 15 form part, and belt guide wheel assemblies, which are shown in FIG. 9. The belt guide wheel assemblies direct the belt onto the drive sprockets 27, 28.

The differential-geared transmission 25 has conventional gearing and preferably a torque-limiting transmission characteristic. The transmission 25 and output shaft 26 are in effect a transaxle unit, such as that of the type used in a Volkswagen Beetle vehicle with appropriate lubrication equipment and modification in the output shafts 26 so that they preferably are inclined somewhat from the vertical, as is seen in FIG. 4. Various other components of the power train 20, including the engine 7, drive shaft 21, clutch 23 and electric motor 24 preferably are positioned at or near the center line 40 of the vehicle 1 for optimum vehicle stability.

The engine 7 preferably is a single-cylinder constant-speed agricultural diesel engine, a steam turbine, a gas turbine, or other suitable prime mover, and it preferably is positioned near the forward end of the vehicle. The eddy-current clutch is mounted some distance behind the engine 7 where it can be magnetically isolated by means of non-metallic shafting and universal joints 22 shown. Such non-magnetic shafting may be the portions of the drive shaft 21 located between the clutch 23 and the two U-joints on opposite sides thereof and most proximate thereto. The electric motor 24 is provided to enable electric powering of the vehicle drive train and particularly the traction drive belts 5 in combination with or independently of the engine 7. An appropriate number of batteries, not shown, may be mounted beneath or within the chassis near the lateral or side edges of the vehicle for stability.

The drive train 19 is designed to permit vehicle operation at highway speeds with the constant-speed prime mover, i.e. the engine 7, in essentially direct mechanical linkage with the differentially geared cogged belt drive sprockets 27, 28 through suitable excitation of the windings in the eddy current clutch 23. At lower speeds, controlled slippage in the eddy current clutch generates electrical power, which can be stored in the batteries or can be applied to the electric motor for use as a supplemental power source for additional acceleration. Control circuitry may be employed to limit the amount of torque applied to the drive sprockets 27, 28 so that the vehicle operator cannot inadvertently damage the cogged surfaces of the traction drive belts 5 by clumsy or wasteful application of power. The combination of a greatly simplified constant-speed prime mover coupled with an eddy current clutch and electric motor permits the vehicle to operate economically on long highway trips while retaining the simplicity and versatility of an all-electric drive system for short trips at relatively low speeds.

The drive sprockets 27, 28 should be placed at the rear of the vehicle because of difficulties that would be encountered with belt tensioning if the belt were to be pushed through the track wheel assemblies from the front of the vehicle. Moreover, the disked brake and sprocket assembly 37, and particularly the braking terminal sprocket 38, should be placed at the forward end of the vehicle for similar considerations. Also, since the braking mechanisms, namely the disk brake and sprocket assembly 37, are mounted with respect to the chassis 4 and are not affected by suspension travel, relatively inexpensive direct mechanical linkages may be used for actuating the same instead of the hydraulic or pneumatic actuators used on conventional vehicles. Although the drive sprockets 27, 28 are mounted in the rear of the vehicle and the disk brake and sprocket assemblies 37 are mounted at the forward end of the vehicle, the vehicle still may operate satisfactorily in reverse as long as speed and torque applied through the drive or brake sprockets are strictly limited.

CHASSIS AND SUSPENSION

Figure 5:
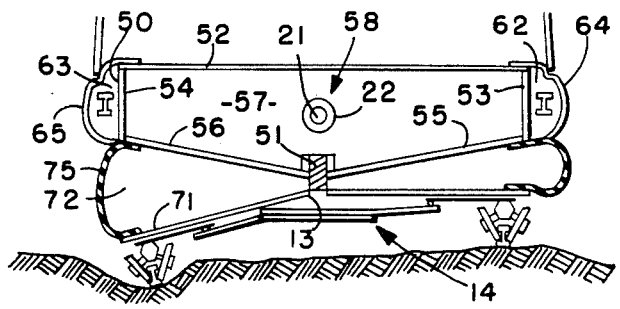
FIG. 5 is a section view of the chassis box, suspension flaps, keel and steering linkage of the vehicle.

The chassis 4 includes a chassis box 50 and a keel 51 seen most clearly in FIGS. 2, 3 and 5. The chassis box 50 may be formed of plywood, plastic composite sheets, metal or the like, and the keel 51 should be of a strong material, such as a wood beam, relatively strong plastic material, metal, or the like. Most preferably, however, the invention would find its most useful applications when the vehicle is constructed to a maximum extent of flexible plastic composite sheets that are suitable contoured and connected to allow the suspension motions and structural functions to be satisfied with a minimum of metallic hardware. Such construction would minimize weight and cost of materials and of manufacturing while providing functional optimization.

Fundamentally, the chassis box 59 includes an integral top panel 52, structural side panels 53, 54, bottom panels 55, 56 and in the interior 57 of the box 50 an interlocking grid of longitudinal and transverse bulkheads or lattice work suitably located to provide structural strength while avoiding interference with operation of the various vehicle components. Such interlocking grid or lattice is generally indicated at 58 in FIG. 5. As is seen in FIG. 5, one of the areas of interference avoidance insofar as such interlocking grid 58 is concerned, is the provision permitting the drive shaft 21 and universal joints 22 to pass through the interior 57 from the engine 7 via the clutch 23 and electric motor 24 to the transmission 25. As is seen in FIG. 5, the bottom panels 55, 56 of the chassis box 50 are attached by conventional means at 59 to the keel 51.

The top panel 52 may be a single sheet of 4 ft. × 8 ft. plywood. The grid 58 should include longitudinal and transverse bulkheads, e.g. of plywood. The top panel 52 is firmly bonded and fastened to the top edges of such grid. Also, each of the transverse bulkheads has a slot at its bottom center point into which is fitted the wooden keel 51.

Several comfort cut-outs 60 are formed in the top panel 52 to provide room for the legs of a passenger or driver of the vehicle 1. Floor panels or floor wells may be inserted in such cut-outs 60 to provide a bottom floor for the feet of the passenger or operator. The top surface of the panel 52 otherwise forms the remaining floor area of the vehicle. Moreover, an additional cut-out 61 is provided in the top panel 52 to accommodate the engine 7, and, if necessary, further cut-outs (not shown) may be provided to accommodate or for access to the clutch 23, electric motor 24, batteries (not shown), etc. The engine 7 may be secured or mounted by conventional means to the keel 51 and/or to the bottom panels 55, 56; and the clutch 23 and motor 24 may be similarly mounted. Conventional means also may be provided to mount the batteries in a desired orientation with respect to the bottom panels 55, 56 preferably near the sides of the vehicle. If necessary, heat shield means, cooling means, and other conventional means may be provided to isolate the engine 7 and/or any other portion of the drive power apparatus 19, for example, from other portions of the vehicle, from the passenger compartment above the chassis and within the body 3, etc., as is well known in conventional vehicles.

The transmission 25 is attached to the keel 51 and/or other portions of the chassis box 50 at the rear end thereof to provide relatively unobstructed interengagement of the respective traction drive belts 5 and drive sprockets 27, 28. The angular mounting of the transmission 25 and drive sprockets 27, 28 provides optimum interconnection with the traction drive belts 5 for efficient power transfer with respect thereto and optimizes overall travel of the belts 5 and use of the work surfaces thereof as will become more apparent from the description below. As is seen in FIG. 5, bottom portions of the respective traction drive belts 5 engage the terrain as the drive belts move in one direction relative to the vehicle to propel the vehicle over the terrain. Return paths for the relatively upper portions of the drive belts are provided at the sides of the chassis box 50 where enclosed channels 62, 63 are formed between respective peripheral portions of the interlocking grid 58 and side covers 64, 65. The channel covers 64, 65 may be formed of light gauge sheet metal attached to the chassis box 50 to provide a conduit for returning the endless traction belts to the front of the vehicle without endangering passengers. Guidance of the traction drive belts 5 with respect to the chassis box 50 is provided by the above mentioned sprockets and wheels as well as by the belt guide wheel assemblies (described below with reference to FIG. 9).

It will be appreciated from the foregoing that the various portions of the chassis 4 are of generally uniform weight and strength with the exception of the added strength of the central keel 51. On the whole, efforts have been made to distribute weight substantially uniformly about the chassis avoiding the need for extra strength at any given portion other than the keel. Moreover, as will become apparent from the immediately following description, the suspension 6 appreciably spreads or distributes suspension forces over substantially the entire chassis, thereby further reducing the strength and weight requirements of the chassis as well as of the suspension.

Briefly referring to FIG. 1 again, the fundamental components of the suspension 6 include plural track wheel assemblies (shown in detail in FIGS. 6 and 7, the individual track wheels 15 being shown here), wheel assembly mounting flaps 71 and air bag springs 72. As is shown clearly in FIG. 1, on one side of the vehicle there are five track wheel assemblies 70, five suspension flaps 71, and a single air bag 72 extending the length of the vehicle. A similar arrangement of five track wheel assemblies and wheel mounting flaps and of one air bag would be included in the suspension 6 on the opposite side of the vehicle. Suspension forces, i.e. those forces required to suspend the chassis above the terrain 2 by the suspension 6 are applied by a smooth surface interengagement between the top surface of the air bags 72 and the bottom surfaces of the respective bottom panels 55, 56 of the chassis box 50 and by a mechanical interengagement between the flaps 71 and the keel 51. Each suspension flap 71 is free to swing up or down from its normal horizontal position and preferably there is a track wheel assembly mounted beneath each suspension flap near its outer edge approximately half way between its leading and trailing edges.

Turning now to FIGS. 3, 5 and 6, it will be seen that the suspension 6 comprises a total of ten wheel mounting flaps 71 attached by a piano hinge type connector 73 to the keel 51, on the one hand, proximate one end thereof and, at the other end, connected to respective track wheel assemblies 70 at connections generally designated 74. Each flap 71 may move substantially independently of the other flaps but being related in its movement pivotally about the piano hinge connector 73 according to the pressure in the air bag immediately above the respective flap; and that pressure will be a function of the forces exerted on the air bag by the other flaps engaged therewith. It will be appreciated that the suspension 6, then, effectively provides ten point supports in the illustrated embodiment, i.e. where the respective track wheel assemblies are located, and the suspension forces, moreover, are distributed via the air bags 72 over substantially the entire extent of the chassis box 50. Accordingly, the total weight and strength of the suspension need not be designed for the extremely high suspension forces encountered in a conventional vehicle where there is only four point support or, in any event, relatively large distances between adjacent suspension support points.

One major aim of the vehicle suspension 6 in accordance with the invention is to minimize the "unsprung weight" or the rotational moment of inertia of the track assembly coupled with a respective suspension flap around the axis of the piano hinge near the center line of the vehicle.

A second major aim of the vehicle suspension 6 is to distribute suspension loads to the vehicle body more uniformly than was in the past so that the body itself can be of lighter, less expensive, more corrosion resistant, and/or more easily fabricated materials than was possible with conventional vehicle design. Suspension loads for conventional vehicles are applied to the chassis (usually of steel) ordinarily at just four points, and the body and/or chassis must be sufficiently rigid to resist these concentrated loads and to carry its own weight plus any payload between the four points without excessive deflection, metallurgical changes or excessive strain. According to the invention, then, by increasing the number of suspension points, the suspension loads become progressively more distributed over the body structure and the structural requirements for the body will diminish accordingly.

A further aim of the invention is to minimize the structural requirements of the vehicle body and to even out the suspension loads with a fairly small number of suspension units, such as five on each side of the vehicle, by replacing the conventional metallic suspension springs with the two relatively large low-pressure air bags 72 that transmit suspension forces from the flaps over the entire lower surface of each side of the vehicle. Although the invention is intended to encompass virtually any reasonable number of suspension flaps 71 whose movement is constrained by substantially horizontal hinges or the like 73 (whether longitudinal, transverse, or in some intermediate orientation), a vehicle with five flaps on each side hinged to a common longitudinal center member in accordance with the present invention is a reasonable compromise between the desire to distribute the weight of the vehicle continuously along the road surface, on the one hand, and the competing desire to keep the steering geometry and mechanisms simple, on the other hand. Moreover, such compromise also will effect a relative minimization of the amount of machining required for manufacturing the multitude of track wheel assemblies 70 required for suspension, i.e. relative to having, for example, more than ten track wheel assemblies per vehicle. The suspension 6 in accordance with the present invention, then, is a relatively uncomplicated means for circumventing suspension problems encountered in previous vehicles while permitting the manufacturing of a light weight vehicle at relatively low cost. Not only are most of the heavy functional mechanisms, i.e. those other than the miniaturized wheels of the track wheel assemblies, spindles, steering swivels, and the suspension flaps themselves, divorced from the unsprung weight, but the spring constants of each suspension unit can be decreased in proportion to the increase in the number of such suspension units beyond the conventional four, i.e. the typical four wheel and suspensions points of a conventional vehicle.

As is seen in FIG. 1, using the suspension 6 of the invention in association with five track wheel assemblies on each side of the vehicle and five flaps, the traction drive belts 5 will be in contact with the terrain or road surface 2 over nearly the entire length of the vehicle while the five track wheel assemblies on each side of the vehicle bear the weight of the vehicle by rolling along the concave surfaces of the respective belts. The weight of the vehicle body is borne by the two elongated air bags 72. Straps, webbing or other restraints 75 may be used to confine the air bags to be compressed between the upper surface of respective suspension flaps 71 and the lower surface of the chassis box bottom panels 55, 56. Since each air bag contains a large quantity of air or other gas, if desired, at relatively low pressure, e.g. from fractional psis to about 10 psis and preferably no more than about 5 psis, it serves as a gas spring of nearly constant force when any one of the five suspension flaps beneath the same is raised above its equilibrium position. Additionally, since the quantity of air within each air bag is free to move wherever compression by the suspension flaps dictates, the suspension load is always uniformly distributed across the entire area of that half of the vehicle bottom, i.e. bottom panel. The absence of concentrated suspension loads means that the vehicle chassis itself can be of very light and uncomplicated structure, similar in construction even to a canoe.

Referring now to FIG. 6, a typical track wheel assembly 70 is shown in detail together with its relationship to a flexible traction drive belt 5 and a plywood suspension flap 71 bearing against a pressurized air bag 72, which serves as a suspension spring for the vehicle. The wheels 15 of the track wheel assemblies 70 may be formed of acetal, nylon, phenolic or other material that has good strength and relatively light weight characteristics and that would cooperate well with the material of which the traction drive belt 5 is formed to provide good mechanical interengagement and support thereof with minimum abrasion or other wear of the wheels and belt. Each wheel has a substantially cylindrical surface 76 to engage a belt flange and a curved peripheral edge surface 77 that cooperates with the belt web to confine the same between pairs of wheels 15 with minimum wear.

The track wheel assembly 70 includes two wheel spindles 80, only one of which is seen in the drawing, rigidly mounted to a suitable support 81 so that their center lines define a specific obtuse angle A. Each spindle 80 is fitted with a light weight, wear resistant track wheel 15 which rotates with minimal friction on suitable bearings 82. The wheels are of a shape and spatial relationship such that the endless traction drive belt is constrained to pass between them without possibility of escape. The periphery of each wheel 15 bears on the upper or relatively internal, i.e. closest to the web, surface 83 of an immediate lower flange 84 of the belt 5, the lower or external surface of which is in turn supported by the terrain or road surface 2. The separation between the pair of track wheels 15 is slightly greater than the thickness of the web 85 of the traction drive belt 5 between them in order to minimize chafing wear of the cogged surfaces 86, 87 of the belt web 85.

The track wheel assembly 70 is mounted on the suspension flap 71 by a pin and bearings 91, 92 so that the entire assembly is free to rotate or swivel around a substantially vertical axis when the plywood flap 71 is at a particular preferred orientation with respect to horizontal illustrated in FIG. 6. Spacer blocks 93, 94 are provided to help distribute force between the suspension flaps 71 and the track wheel assembly 70.

Swiveling of the track wheel assembly 70 may be effected under firm control through a steering linkage arm 95. Such arm is rigidly attached to the track wheel assembly, for example by welding at 96, for example, and extends toward the center line 40 of the vehicle 1 for connection as part of the steering linkage assembly 14 as will be described further below. Moreover, as is shown in FIG. 6, the air bag 72 adapts to the shape of the suspension flap 71 and particularly the discontinuity in the upper smooth surface thereof caused by the head 97 of the pin 90 and the surface of the upper spacer block 94. If desired, to avoid damage to the air bag by the discontinuities effected by the spacer block 94 and head 97, a cushioning or smoothing material may be provided between the same and the air bag.

An alternate embodiment of track wheel assembly 70' is shown in FIG. 7, wherein primed reference numerals represent parts corresponding to the same unprimed reference numerals shown in FIG. 6, for example. The support 81' to which the wheel spindles 80' are attached is a piece of metal tube of a cross section suitable for positioning the pair of wheels 15' such that their axes define the desired included angle A'. Ball races 100, 101 for a swivel bearing 102, 103 may be coined in the upper surface of the support 81' before the tube is formed and welded. The continuity of the vertical surfaces of this type of track wheel assembly support, coupled with its close approach to the immediate upper surface 104 of the track belt 5 and the possibility of close integration with the contours of a molded plastic suspension flap 71', helps to maintin a smooth air flow around the suspension parts and to permit maintaining a stabilizing vacuum beneath the vehicle 1 at high speeds. Such vacuum may be generated and designed, as desired, as a result of suitable contours at the underside of the vehicle 1.

The upper flange 105 of the swivel bearing arrangement 106 can be fastened directly to the lower surface of the suspension flap 71' without presenting any substantial projections through to the upper surface of the latter that might otherwise tear the air bag 72'. The entire track wheel assembly 70' could be easily removed and inexpensively replaced as a unit simply by removing one wheel 15' from its spindle 80' and the mounting bolts and nuts 107, 108 by which the flange 105 and, thus, the entire track wheel assembly 70' are attached to the suspension flap 71'.

To help design the desired vacuum beneath the vehicle that would tend to hold the vehicle in prescribed manner to the roadway surface, especially at high speeds, thereby obtaining maximum stability and operational safety, the suspension flaps 71' may include fairing surfaces, such as the one shown at 110 in FIG. 7.

TRACTION DRIVE BELT

Figure 8:
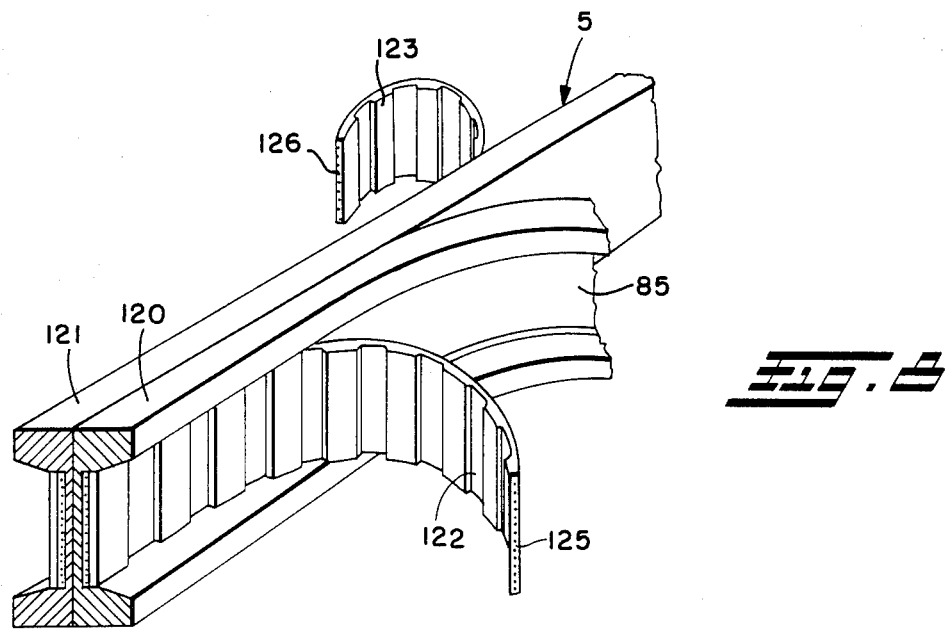
FIG. 8 is an isometric view, partly exploded, of a track belt of the vehicle.

A preferred form of traction drive belt 5 is shown in FIG. 8. Other belt constructions with suitable longitudinal reinforcement, placement of cogged surfaces, and similar cross section (or any other cross section which can be positively constrained both vertically and laterally by a pair of beveled wheels) also may be used in accordance with the invention.

The most preferred configuration for the traction drive belts 5 is that of a I cross section belt which has an intermediate web and flanges on opposite sides thereof, as is clearly seen in the drawings. The web 85 preferably has parallel cogged surfaces 86, 87 (FIG. 6). As is also seen in FIG. 6 preferably the concave surfaces of the flanges 84, 84a on which the track wheels are to bear the distributed weight of the vehicle, can be angled somewhat from the horizontal. Therefore, the load bearing surfaces 76 of the track wheels 15 can be approximately cylindrical to minimize wearing of the belt and wheels through chafing; this is in contrast to the cooperation of a track wheel with a generally conical load bearing surface which would undergo substantial chafing relative to the belt flanges and, thus, would encounter substantial wear of the belt and wheels. The I cross section belt additionally can be very flexible in the lateral direction in order to accommodate the pecularities of the steering mechanisms which are described below while at the same time being fairly rigid in the vertical direction in order to bridge the path of the relatively small diameter track wheels 15 over obstacles or defects in the terrain or road surface 2. As is seen in FIG. 6, the external surface of the flange 84, i.e. that surface thereof most remote from the web 85, engages the terrain 2 in close adherence or following thereto.

According to the best mode and preferred embodiment of the present invention, each traction drive belt 5 is formed as a Moebius strip. In the Moebius strip configuration the remote surface of one flange, say flange 84, will engage the terrain 2 during one rotation or portion of a rotation of the belt 5 along its total travel path as used in the vehicle 1; and during the next rotation the remote surface of the opposite flange 84a will engage the terrain 2. Furthermore, due to such effective rotation of the drive belt in the form of a Moebius strip, during one passage or cycle of the drive belt the cogged surface 86 will engage one of the drive sprockets 27, 28, and during the next cycle the other cogged surface 87 will engage the drive sprocket. As a result of forming the traction drive belt in the form of a Moebius strip, the opposite flanged surfaces or treads of the belt will receive equal wear as traction surfaces, i.e. those surfaces engaged with the terrain 2, and opposite cogged surfaces also will receive equal wear as power transmission surfaces. Still furthermore, opposite internal surfaces, such as surfaces 83, 83a of the flanges will receive uniform wear. A further advantage of the Moebius strip construction is the flexing of the belt 5 in opposite directions during successive passages or cycles around the brake and drive sprockets, thereby dislodging any accumulation of mud or other fine material from between the cogs before they can cause slippage or damage to the belt.

As is illustrated in FIG. 8, the traction drive belt 5 is formed by a pair of channel cross section extruded members 120, 121 of a wear resistant elastomer, including, but not limited to, rubber or urethane compositions. To the enclosed web of each channel is bonded a laterally flexible cogged belt 122, 123, such as a length of timing belt, for example a one and one-half inch width Dodge type "H" timing belt. Preferably the cogged belt has a reinforcement consistent in the amount of power required to drive the vehicle during any foreseeable conditions of operation. Such reinforcement is shown at 125, 126 in each timing belt. The two channels 120, 121, with their respective cogged belts fastened to the web portions of each may be bonded together in the manner shown in FIG. 8 to form the I cross section traction drive belt. Moreover, the ends of the traction drive belt may be attached to form a loop; but prior to forming such loop, such ends would be relatively rotated a total of 180° from each other so as to form the Moebius strip.

As was described above, the belt guide wheel assemblies 130 (FIG. 9) help to guide the belt 5 along its path relative to respective track wheel assemblies, sprockets, idler wheels, etc. It will be appreciated that such guidance and particularly the guidance of the traction drive belts 5 in the curved paths up to the area of the drive sprockets 27, 28 and brake sprockets 38 near the center line of the vehicle following the approximate angles shown in the drawings will facilitate use of belts in the form of Moebius strips. Furthermore, by bringing the belts to the areas of the drive sprockets and brake sprockets, the rotational inertia at lateral extremities of the vehicle and the weight of various mechanical connections thereto and therefor, such as the output shaft 26, the linkages to the disk brakes, and the piston actuator 36 apparatus can be minimized, thus further improving the overall stability and weight minimization of the vehicle.

Briefly referring to FIG. 9, a typical belt guide wheel assembly is shown at 130. Any desired number of such belt guide wheel assemblies may be used in the vehicle 1 in order to provide appropriate guidance of the respective traction drive belts 5 along the desired paths. A curved metal tubing 131 may be mounted in the vehicle 1 along the path of each traction drive belt 5 to define the path of the belt. A mounting bracket 132 attached to the tubing 131 supports a pair of wheel spindles 133, and the belt guide wheels 134 are mounted on respective spindles. The belt guide wheels 134 preferably are formed of wear resistant acetal or urethane material that is relatively light weight and long lasting and encounters minimum wearing to itself and causes minimum wearing to the belt as they interengage each other in the manner shown in FIG. 9. Appropriate bearings (not shown) may be provided to facilitate rotation of the belt guide wheels 134 about respective spindles 133. Moreover, the respective guide wheels may have chamfered surfaces 135 to facilitate interengagement with the relatively interior surfaces 83, 83a of the belt flanges 84, 84a. The spacing between the pair of belt guide wheels of each belt guide wheel assembly preferably is such that they provide good constraint of the belt along the desired path with minimum frictional wearing of either the wheel or belt.

STEERING ASSEMBLY

The steering gear 13 operates the steering linkage assembly 14 for controlling the orientation of the various track wheel assemblies 70 and is fastened to the front side of the most forward bulkhead of the chassis box 50 where its output arm may operate the steering of two movable plywood or other material steering linkage panels 151, 152 mounted beneath the suspension flaps 71.

Figure 10:
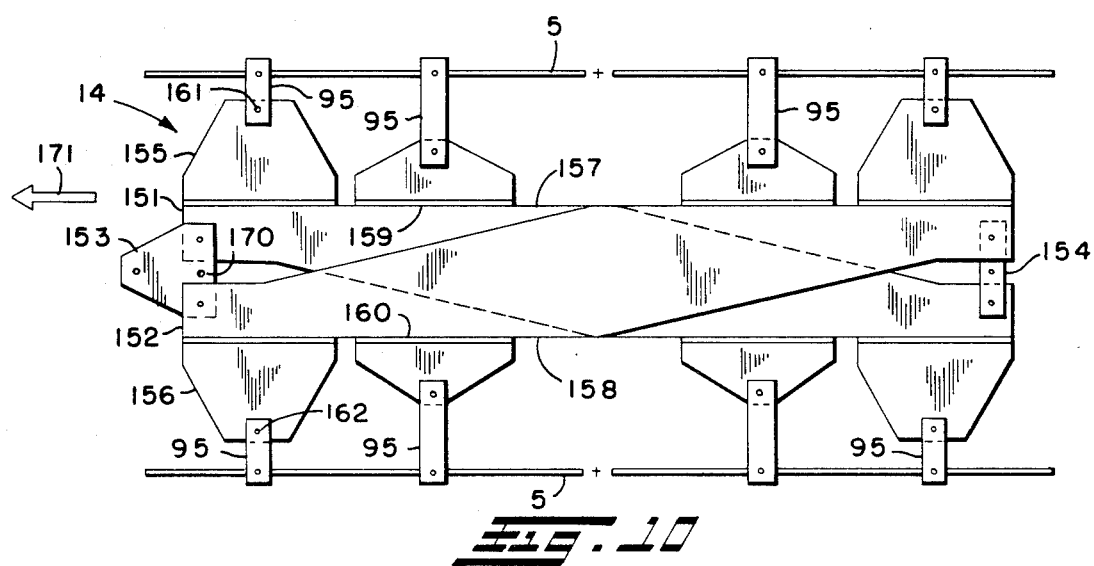
FIGS. 10 and 11 are schematic plan views of the steering linkage assembly in straight and turning modes.
Figure 11:
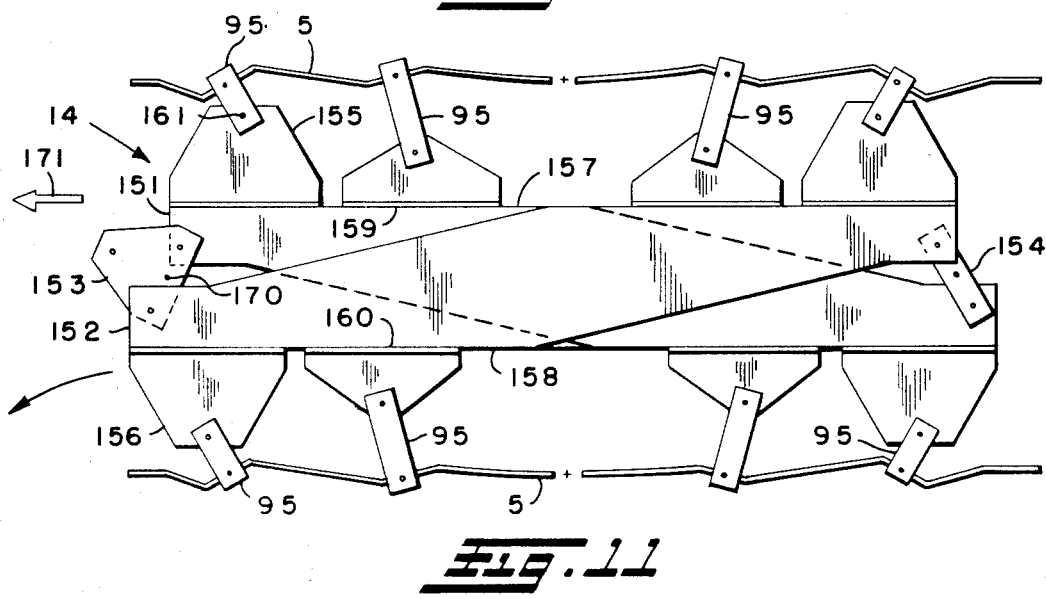

FIG. 10 is a top plan view of the steering linkage panels 151, 152 oriented with respect to the traction drive belts 5 and the individual track wheel assemblies 70 to steer the vehicle straight ahead in a forward or reverse motion. FIG. 11 is similar to FIG. 10 except the steering linkage panels 151, 152 are linearly moved relative to each other to steer the vehicle in a turn.

The panels 151, 152 are mounted one above the other immediately beneath the keel 51 in such manner that they cannot interfere with vertical travel of the suspension flaps 71, as can be seen in the tranverse cross section illustration of FIG. 5. Both panels 151, 152 are connected at their forward end to a swivel plate 153 which is supported by the keel 51 and can be rotated about a vertical axis by means of a mechanical linkage (not shown) to the output arm of the steering gear 13. Both panels 151, 152 are similarly connected at their rear end to an idler swivel 154, which supports the panels from the keel 51 and maintains them in proper relative positions. Longitudinal slots may be cut in the center of each panel 151, 152 so that a trunnion assembly (not shown) mounted to the bottom of the keel 51 can support them at mid-span to prevent excessive deflection from a horizontal plane under load conditions.

Short plywood connecting flaps 155, 156 attached to the longitudinal edges 157, 158 of the panels 151, 152 by panel hinges 159, 160, for example, connect the panels, 151, 152 with respective steering linkage arms 95 of respective track wheel assemblies. The flaps 155, 156, then, may pivot about a substantially horizontal axis of such hinges 159, 160. A ball-and-socket type connection 161, 162, i.e. permitting swiveling about any axis, is made between the respective connecting flaps 155, 156 and the steering linkage arms 95. Such use of the pivoting flaps 155, 156 and the connections thereof to the steering linkage arms provides a secure connection between the respective steering linkage panels 151, 152 and track wheel assemblies 70 regardless of any motion experienced by the suspension flaps 71. The connecting flaps 155, 156, too, vary in their lateral reach in order to complement the varying length of the track wheel assembly steering arms 95, as can be seen most clearly in FIGS. 10 and 11, in order to result in different amounts of turning for the various track wheel assemblies during a turn. The behavior of the various track wheel assemblies and members shown in FIGS. 10 and 11 during execution of a left turn is illustrated in FIG. 11.

Turning of the steering wheel 11 effects a desired output from the steering gear box 13 to effect pivoting movement of the forward swivel plate 153, and, thus, appropriate turning of the vehicle, as desired. More specifically, as plate 153 is turned, for example, clockwise, about its pivot connection 170 to the keel 51, panel 151 moves linearly backward and panel 152 linearly forward, relative to the forward travel direction of the vehicle represented by arrow 171. The panels 151, 152 cross like an X such that the panel 151 is coupled to swivel the two track wheel assemblies 70 at the front right portion of the vehicle and the two at the left rear portion. The panel 152 similarly is coupled to the two left front and two right rear track wheel assemblies 70. Therefore, the mentioned rearward movement of panel 151 turns or swivels the two right front assemblies 70 counterclockwise and the two left rear assemblies 70 clockwise. The same is true of the assemblies 70 coupled to panel 152, as is seen in FIG. 11. As a result, the turning radius of the vehicle 1 will be minimized.

The track wheels 15 on the side of the vehicle toward the inside of a turn *can* be made to turn through a greater angle than the track wheels on the opposite side of the vehicle. This function is accomplished as long as the swivel points of the forward swivel plate 153 and the rear idler swivel 154 are moved somewhat ahead of the points of connection to the steering linkage panels. Therefore, the belt to the inside of a turn will be subjected to greater drag both because of increased flexing and chafing through the succession of track wheel assemblies 70 and because the portion of any belt between two track wheel assemblies must slide laterally by an amount directly related to the angle the track wheel assemblies are turned. Since both belts 5 are driven through a common differential gearing in the transmission 25, there is a natural braking of the belt to the inside of the turn causing more power to be applied to the belt at the outside of the turn, thus greatly facilitating the maneuverability of the vehicle.

If desired, an emergency braking system may be provided for the vehicle 1. Such emergency braking system may include a means (not shown), such as a direct mechanical linkage to the assembly 14 which moves the axes of both the forward swivel plate 153 and rear idler swivel 154 forward by an equal amount. As a result, all track wheels on both sides of the vehicle will tend to toe outward at the same time. The resultant chafing provides an effective emergency means of braking the vehicle whether in motion or at rest and regardless of the condition (or even complete removal) of either drive belt 5.

STATEMENT OF INDUSTRIAL APPLICATION

In view of the foregoing, it will be appreciated that the present invention may be employed in a variety of vehicles of current form and in combination to provide a novel improved vehicle overall. Such vehicle may be used for a host of purposes some of which are mentioned above.

I claim:

1. A vehicle comprising a box-like chassis having a relatively smooth lower surface and a keel, and suspension means for suspending said chassis relative to a surface, said suspension means including plural flaps pivotally attached to said keel and plural air bags positioned between said flaps and said smooth lower surface for spreading suspension forces over a substantial portion of said chassis with at least one of said air bags being positioned between said smooth lower surface and more than one of said flaps.

2. A vehicle, comprising a box-like chassis and suspension means for suspending said chassis relative to a surface, said suspension means comprising plural flaps beneath and connected to said chassis for pivotal movement, plural means for supporting the vehicle respectively connected to said flaps, and gas spring means positioned between said flaps and said chassis for spreading suspension forces over a major portion of said chassis, the pivot axes of said plural flaps extending generally parallel to the longitudinal axis of said chassis, said gas spring means including plural air bags positioned between said flaps and said chassis for distributing force therebetween, and each air bag being positioned between a plurality of said flaps and said chassis.

3. The vehicle of claim 2, wherein said plural means for supporting includes a plurality of track wheel means for supporting the vehicle, said track wheel means being attached to the peripheral portion of respective flaps.

4. The vehicle of claims 2 or 3, further comprising traction belt means of the endless type for providing motive drive for the vehicle.

5. The vehicle of claim 4, said traction belt means comprising a Moebius strip.

6. The vehicle of claim 4, further comprising braking means for applying braking force to said traction belt means at the front of the vehicle proximate the center-line thereof.

7. The vehicle of claim 4, further comprising sprocket drive means for applying drive force to said traction belt means at the rear of the vehicle proximate the center-line thereof.

8. The vehicle of claim 4, further comprising structural member means positioned along the travel path of said traction belt means for defining such travel path and belt guide wheel means supported by said structural member means for constraining said traction belt means to follow such travel path.

9. The vehicle of claim 2, further comprising traction belt drive means for providing motive drive for the vehicle, thermal engine means for providing motive power to said traction belt means, and transmission means for coupling motive power from said engine means to said traction belt means.

10. The vehicle of claim 9, further comprising a hysteresis clutch for transmitting motive power from said engine means to said transmission means.

11. The vehicle of claim 10, said hysteresis clutch comprising an eddy-current clutch.

12. The vehicle of claims 9 or 11, further comprising electric motor means for applying motive power to said transmission means.

13. The vehicle of claim 12, wherein said engine means comprises a constant-speed engine.

14. The vehicle of claim 2, said chassis and suspension comprising relatively low-strength, lightweight panels.

15. The vehicle of claim 14, further comprising more than four steerable track wheel assembly means for supporting said chassis and for providing steerability therefor.

16. The vehicle of claim 2, wherein said air bags are relatively low pressure air bags containing air at a pressure of from about a fractional psig to about 10 psig.

17. The vehicle of claim 16, said air pressure being in the range of from a fractional psig to about 5 psig.

18. The vehicle of claim 2, further comprising traction belt drive means for supplying drive power for the vehicle, and means for applying braking and tractive torques to said traction belt drive means, and means for mounting said means for applying to said chassis such that said means for applying are separated from suspension motions encountered by said suspension but ordinarily not fully transferred to said chassis.

19. The vehicle of claim 2, further comprising an endless traction drive belt for a vehicle having reentrant cross-section means for permitting positive constraint laterally and vertically between mating outer contours of a pair of track wheels of oppositely inclined axes without substantially interfering with longitudinal motion of the belt relative to such vehicle.

20. The vehicle of claim 19, further comprising at least one flange means for direct engagement with the terrain over which the vehicle is intended to travel and at least one web means for receiving motive input to drive the belt to move the vehicle, said web means including at least one surface portion that extends in a direction that is generally perpendicular to said flange means, and said surface portion has means for receiving such motive input and transmitting the same to said flange means.

21. The vehicle of claim 19, said vehicle comprising a belt member whose cross-section is symmetrical about two different axes, said belt member comprising an elastomeric strip twice the circimferential length of the belt and having half of the cross-section of the belt fastened or bonded to itself in the form of a Moebius strip.

22. The vehicle of claim 2, a track wheel assembly for supporting a reentrant traction belt of the vehicle from said suspension, including a pair of laterally inclined track wheels whose peripheral surfaces are contoured to mate with the reentrant surfaces 23. The vehicle of claim 22, wherein such belt has an I-cross-section, and further comprising spindle means for mounting said track wheels such that their rotational axes define an obtuse angle.

24. The vehicle of claims 22 or 23, further comprising swivel mounting means for mounting said wheels for swiveling about a common axis.

25. The vehicle of claim 22, wherein said track wheels have a generally cylindrical surface means for engaging the flange of the belt to transfer the weight of the vehicle with respect thereto.

26. The vehicle of claim 25, wherein said track wheels have a further surface generally parallel to the web for confining said belt between the pair of track wheels.

27. The vehicle of claim 2, further comprising a steering apparatus for the vehicle, the vehicle having a plurality of steerable track wheel assemblies, said steering apparatus including turning means for turning a plurality of said track wheel assemblies different amounts according to the relative locations of such assemblies on the vehicle.

28. The vehicle of claim 27, wherein said track wheel assemblies are mounted to swivel about a substantially vertical axis, and wherein said turning means comprises linkage means for effecting swiveling of said track wheel assemblies.

29. The vehicle of claim 28, further comprising connecting means for connecting said linkage means to said track wheel assemblies.

30. The vehicle of claim 29, wherein there are plural linkage means of different respective effective lengths, and further comprising means for simultaneously moving plural linkage means.

31. The vehicle of claim 28, said linkage means comprising steering arm means rigidly coupled to respective track wheel assemblies, flap means pivotally connected to steering arm means for relatively pivoting in one plane, and moving means for substantially linearly moving plural flap means simultaneously the same amount while effecting different amounts of swiveling of respective track wheel assemblies.

32. The vehicle of claim 31, wherein said track wheel assemblies are independently suspended from the vehicle and further comprising means for mounting said flap means relative to said moving means to permit pivotal movement of the pivotal connection of said steering arm means and flap means in a generally vertical direction.

33. The vehicle of claims 30, 31 or 32, further comprising an endless traction drive belt for the vehicle having reentrant cross-section means for permitting positive constraint laterally and vertically between mating outer contours of a pair of track wheels of oppositely inclined axes without substantially interfering with longitudinal motion of the belt relative to such vehicle.

34. The vehicle of claim 33, wherein the vehicle has at least two belts, one on each side of the vehicle, at least four track wheel assemblies for each belt, and wherein said turning means comprises means for turning a plurality of said track wheel assemblies on one side of the vehicle by different amounts and in different directions and for turning a plurality of track wheel assemblies on the other side of the vehicle also by different respective amounts and in different directions.

35. The vehicle of claim 27, said turning means comprising steering arm means coupled to respective track wheel assemblies for turning the same, and moving means for simultaneously moving one end of each of said steering arms in generally linear direction to effect simultaneous swiveling of plural track wheel assemblies, and wherein plural steering arm means have different effective lengths thereby to effect swiveling of the track wheel assemblies by different respective amounts.

36. The vehicle of claim 35, said moving means comprising ghenerally linear panel means for applying such moving input to said steering arms from generally along the centerline of the vehicle.

37. The vehicle of claim 36, said moving means comprising generally linear panel means movable in relatively opposite linear directions to turn the vehicle by swiveling different track wheel assemblies by different amounts.

38. The vehicle of claim 37, further comprising an endless traction drive belt for the vehicle having reentrant cross-section means for permitting positive constraint laterally and vertically between mating outer contours of a pair of track wheels of oppositely inclined axes without substantially interfering with longitudinal motion of the belt relative to such vehicle, and said belt having sufficient flexibility laterally to flex as it passes through said track wheel assemblies upon rotation of the latter about a substantially vertical axis.

39. The vehicle of claim 27, said turning means comprising generally horizontal steering linkage members coupled to respective track wheel assemblies for swiveling the same about generally vertical axes, moving means movable generally linearly for applying force to said steering linkage member to effect such swiveling, and means for permitting relative vertical movement between said steering linkage member and said moving means.

40. The vehicle of claim 39, said means for permitting comprising flap means for coupling said moving means and said steering linkage member.

41. The vehicle of claim 2, further comprising traction belt means for moving the vehicle along a surface, brake sprocket means for applying braking force to said traction belt means for slowing or stopping the vehicle, and tensioning means for applying tensioning force to said traction belt means just prior to the point where the latter phase around said brake sprocket means.

42. The vehicle of claim 2, further comprising an endless traction drive belt including at least one flange means for direct engagement with the terrain over which the vehicle is intended to travel and at least one web means for receiving motive input to drive the belt to move the vehicle, said web means including at least one surface portion that extends in a direction that is generally perpendicular to said flange means, and said surface portion has means for receiving such motive input and transmitting the same to said flange means.

43. The vehicle of claim 42, said vehicle comprising a belt member whose cross-section is symmetrical about two different axes, said belt member comprising an elastomeric strip twice the circumferential length of the belt and having half of the cross-section of the belt fastened or bonded to itself in the form of a Moebius strip.

44. The vehicle of claim 2, further comprising an endless traction drive belt including at least one flange means for direct engagement with the terrain over which the vehicle is intended to travel and at least one web means for receiving motive input to drive the belt to move the vehicle, said web means including at least one surface portion that extends in a direction that is generally perpendicular to said flange means, and said surface portion has means for receiving such motive input and transmitting the same to said flange means.

45. The vehicle of claims 19, 42 or 44, wherein said vehicle has an I cross-section.

46. The vehicle of claim 45, further comprising cog means on the web of said belt for receiving motive input to drive the belt.

47. The vehicle of claim 46, wherein said cog means is on both sides of said web.

48. The vehicle of claims 19, 42 or 44, comprising track wheel assembly means for cooperating with the belt to support the vehicle and to hold the belt with respect to the vehicle, and said belt having sufficient flexibility laterally to flex as it passes through said track wheel assembly means upon rotation of the latter about a substantial vertical axis.

49. The vehicle of claims 19, 42, or 44, comprising track wheel assembly means for cooperating with the belt to support the vehicle and to hold the belt with respect to the vehicle, said belt having a cross-sectional height and a sufficient vertical stiffness to bridge obstacles or defects in the surface over which the same and the vehicle pass so that track wheels of said track wheel assembly means of a radius comparable to the belt height can roll safely over such obstacles or defects without damage either to the wheels or the vehicle suspension member.

50. The vehicle of claim 2, comprising traction drive belt means for interfacing with a surface relative to which the vehicle may travel to effect relative movement between such surface and the vehicle, a constant speed thermal engine means for producing a substantially constant speed mechanical output, and an hysteresis clutch means for controllably transmitting motive power between such engine means and traction drive belt means.

51. The vehicle of claim 50, said hysteresis clutch means comprising an eddy-current clutch.

52. The vehicle of claims 50 or 51, further comprising storage means for storing electric power and said clutch means being capable of generating electric energy for storage in said storage means.

53. The vehicle of claim 52, further comprising electric motor means operable in supplement to work effort produced by said engine means for supplementing the drive effort of said traction drive belt means during acceleration.

54. The vehicle of claim 50, further comprising electric motor means operable in supplement to work effort produced by said engine means for supplementing the drive effort of said traction drive belt means during acceleration.

55. The vehicle of claim 54, further comprising drive shaft means for coupling mechanical output from said engine means to said traction drive belt means, and said electric motor means being coupled to said drive shaft selectively to supplement the mechanical output therefrom to said drive shaft or to provide power to said drive shaft independently of said engine means.

56. The vehicle of claim 50, said traction drive belt means including at least two belts one on each side of the vehicle, braking sprocket means for applying braking force to said belts, mounting means for mounting said braking sprocket means at the usual directional front of the vehicle, differentially-geared traction belt drive sprocket means for applying driving force to said traction drive belt means, and further mounting means for mounting said drive sprocket means at the directional rear of the vehicle with the axes of said drive sprocket means oriented in a direction that is generally perpendicular to the travel direction of such traction drive belt means with respect to the surface over which the latter travels during movement of the vehicle.

57. The vehicle of claim 2, further comprising traction drive belt means for moving the vehicle with respect to a surface including at least two belts, one on each side of the vehicle, braking sprocket means for applying braking force to said traction drive belts, mounting means for mounting said braking sprocket means at the usual directional front of the vehicle, differentially-geared traction belt drive sprocket means for applying driving force to said traction drive belt means, and further mounting means for mounting said drive sprocket means at the directional rear of the vehicle with the axes of said drive sprocket means oriented in a direction that is generally perpendicular to the travel direction of such traction drive belt means with respect to the surface over which the latter travels during movement of the vehicle.

58. The vehicle of claim 57, further comprising belt guide wheel means for guiding said belts in prescribed paths.

59. The vehicle of claim 2, wherein said plural flaps are arranged on each side of the approximate center line of the vehicle.

60. The vehicle of claim 2, wherein said flaps are arranged in two sets at respective opposite sides of the center line of the vehicle, and an air bag is provided for each set.

61. In a vehicle having a chassis and relatively heavy mechanical components for transmission of braking and tractive torques, the improvement comprising suspension means for such vehicle that separates suspension motions from such relatively heavy mechanical components, and a flexible traction drive belt for transmitting tractive and braking forces to the surface over which such vehicle may travel, said suspension means including flap means pivotable with respect to such chassis for supporting at least a portion of the weight of the vehicle while distributing suspension forces to a relatively large portion of such chassis, said flap means including plural flaps on each side of the approximate center line of the vehicle, and at least one gas spring means positioned between such chassis and more than one of said flaps.

62. The vehicle of claim 1, said chassis comprising a box-like chassis.

63. The vehicle of claim 62, wherein the pivot axes of said plural flaps extend generally parallel to the longitudinal axis of said box-like chassis.

64. The vehicle of claim 63, said gas spring means comprising plural air bags positioned between said flaps and said chassis for distributing force therebetween.

65. The invention of claim 59 or 61, further comprising means for connecting said flaps to said chassis at least approximately along the centerline of the vehicle.

66. The invention of claim 65, further comprising a wheel assembly mounted on at least a plurality of said flaps for supporting the vehicle.

67. The invention of claim 66, wherein the top surface of said flap means and a bottom surface portion of said chassis are substantially smooth, and further comprising a gas bag spring means positioned in the volume between said surfaces and surface portions.

68. The invention of claim 67, further comprising constraining means for substantially confining said gas bag spring means to within such volume.

69. The invention of claim 67, said gas bag spring means comprising plural air bags containing air at between a fraction psig to about 5 psig.

70. The invention of claim 69, wherein each of said air bags is elongated to extend substantially the entire length of the vehicle.

* * * * *